May 1, 1951  A. L. PARKER  2,551,045
SHUTTLE VALVE
Filed Sept. 7, 1944
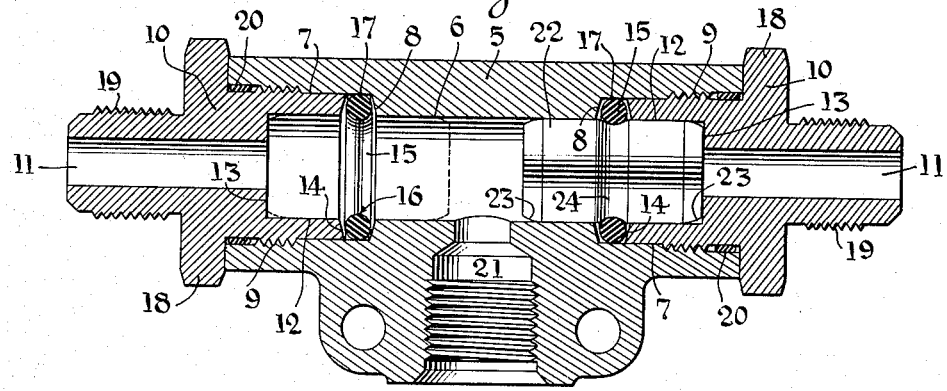
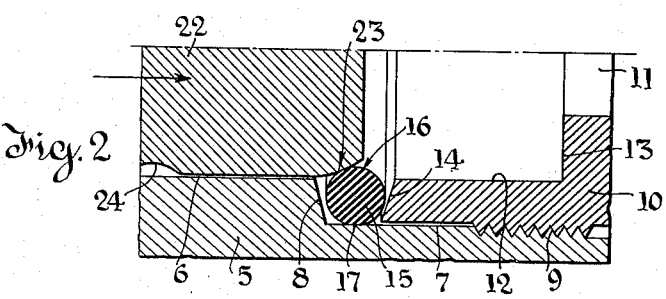
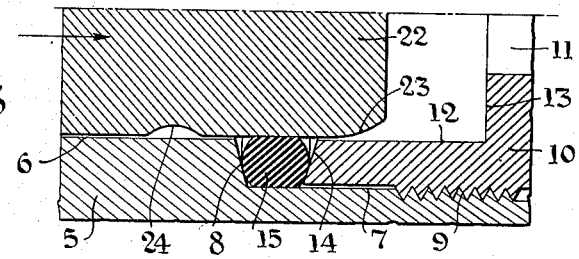
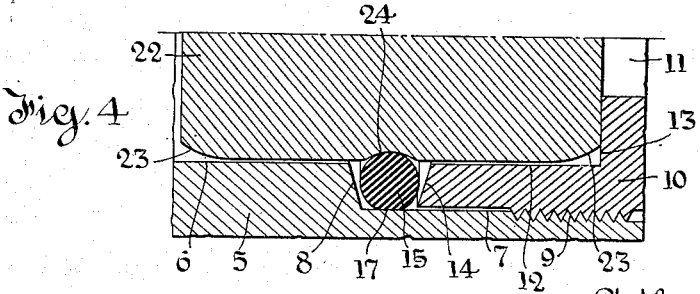
Inventor
Arthur L. Parker
By
Mason, Porter & Diller
Attorneys Patented May 1, 1951

2,551,045

UNITED STATES PATENT OFFICE 2,551,045

SHUTTLE VALVE

Arthur L. Parker, Cleveland, Ohio, assignor to The Parker Appliance Company, Cleveland, Ohio, a corporation of Ohio Application September 7, 1944, Serial No. 553,063

4 Claims. (Cl. 251—118)

The invention relates generally to valve structures and primarily seeks to provide certain new and useful improvements in shuttle valves of the general type disclosed in the application for U. S. Letters Patent filed by Joseph F. Melichar on January 30, 1943 and identified by Serial Number 474,155, which matured into Patent No. 2,408,799 on October 8, 1946.

Valves of the general type stated include a casing having two coaxially arranged seats and inlet ports passing through said seats, an intermediately disposed outlet port, and a shuttle valve element slidably mounted in the casing and adapted to be pressure shifted to one end or the other of the casing, or against one or the other of the seats to close the port over which said element is seated and render the other or dominant pressure source port effective to deliver fluid to the outlet port, and it is an object of the present invention to provide a novel gasket equipment and mountings therefor effective to serve the twofold function of sealing the valve structure against leakage past the shuttle valve element when shifted to one or the other of its seating positions, and to yieldably retain said element in either seating position to which it has been shifted.

In its more detailed nature the invention resides in providing a valve structure including a casing having a port and seat arrangement of the character stated, and a cylindriform shuttle valve element having an annular groove intermediate its ends, said casing having an annular groove therein adjacent each end seat and a ring gasket in and projecting inwardly from each casing groove in position to engage the shuttle valve element groove in fluid sealing contact and in a manner for yieldably holding said element in the seating position to which it has been shifted.

Another object is to provide a valve structure of the character stated in which the inlet ports and the seats or stop shoulders are formed in end members threadably mounted in end counterbores in the casing, and in which the ring gasket mounting grooves are formed between the opposing ends of the counterbores and the end members.

With the above and other objects in view that will hereinafter appear, the nature of the invention will be more clearly understood by reference to the following detailed description, the appended claims, and the several views illustrated in the accompanying drawing.

In the drawing:

Figure 1 is a longitudinal sectional view illustrating a valve structure embodying the invention.

Figure 2 is an enlarged fragmentary sectional view illustrating the shuttle valve element as approaching one end of the valve structure and about to contact and pass over the ring gasket in said end.

Figure 3 is a view similar to Figure 2 illustrating the shuttle valve element as passing over the ring gasket.

Figure 4 is a view similar to Figure 2 illustrating the shuttle valve element as having reached its seat or stop abutment and the ring gasket as engaging as a yieldable retaining means in the shuttle valve element groove.

In the example of embodiment of the invention herein disclosed, the improved valve structure includes a casing 5 having a longitudinal cylindrical bore 6 and a counterbore 7 in each end thereof, each said counterbore terminating in a slightly angled wall 8.

Each counterbore 7 is internally threaded as at 9 to threadably receive an end member 10, and each member is equipped with an inlet bore 11 axially aligned with the casing bore 6 and a counterbore 12, the latter forming a seat or stop abutment wall 13 and being of the same diameter as the longitudinal bore 6 of the casing and axially aligned therewith. The inner end wall 14 of each end member 10 is inclined slightly in an inward and endwise direction and is spaced endwise from the adjacent casing counterbore wall 8 so as to cooperate therewith in providing an annular groove in which to receive a ring gasket 15. It will be apparent by reference to Figure 1 of the drawing that two such ring gaskets are provided and it is preferred that each such gasket shall be in the form of an O ring, that is a ring which is circular in radial cross section and of a size to project inwardly a limited distance into the casing bore 6 as at 16, and to present its outside diameter in position for engaging in sealing contact in the respective casing groove as at 17.

It will be observed by reference to Figure 1 that each end member 10 includes an abutment head 18 which is engageable with the respective end of the casing 5 to definitely place the end member wall 14 with relation to the casing counterbore wall 8, thereby to definitely determine the width of the ring gasket receiving casing grooves. Each end member also includes an externally threaded end extension 19 for attachment to a fluid supply line, and a sealing gasket 20 may be inserted between each end member and the respective end of the casing so as to prevent leakage of fluid between the end members and the casing ends. The gaskets 20 may take the form of flattened O rings.

The casing 5 is provided with a single outlet port 21 which opens transversely from the longitudinal bore 6 in the casing, centrally of the ends thereof.

A cylindriform shuttle valve element 22 is slidably mounted in the longitudinal bore 6, 12 formed in the casing, and this valve element includes rounded end tapers 23 and a centrally disposed annular groove 24.

It will be apparent by reference to Figure 1 that whenever pressure of fluid entering through the inlet port 11 at the left of the valve structure is dominant, the shuttle valve element 22 will be shifted to the right as illustrated in full lines in said figure, thereby uncovering the outlet port 21 to the pressure fluid entering from the left side of the valve structure. Whenever the pressure of fluid entering through the inlet port 11 at the right in Figure 1 is dominant, the shuttle valve element 22 will be shifted from the full line position illustrated in said Figure 1 to the dotted line position illustrated at the left in said figure, thereby uncovering the outlet port 21 so as to permit passage therethrough of the fluid entering from the right hand end of the valve structure. In either of the shifted positions of the shuttle valve element 22, said valve element will come against the seat or stop abutment wall 13 at the respective end of the valve structure so as to close the inlet port 11 at the particular end of the valve structure, and in this position the annular groove 24 in the center of the shuttle valve element will be disposed to receive the inwardly projected portion of the respective ring gasket 15, and said ring gasket will perform the two fold function of forming a seal around the shuttle valve element preventing leakage of fluid past and into the noneffective inlet port 11, and also as a yieldable retaining means effective to yieldably retain the shuttle valve element in its shifted position.

As previously stated, each end of the shuttle valve element is provided with a well rounded taper 23 so that said element will engage the ring gaskets in such manner as not to induce pinching of said gaskets. This tapered end contact of the shuttle valve element with the ring gaskets also serves to reduce the effort required to shift said element. In Figure 2 of the drawing, the shuttle valve element is shown as sliding toward an end of the valve structure with the round tapered end 23 thereof making initial contact with the ring gasket at the respective end of the valve structure. In Figure 3 the shuttle valve element is shown as passing over the ring gasket, and in Figure 4 the shuttle valve element has reached its seat and the ring gasket is shown as engaging in yieldable position retaining contact in the annular groove 24 in the shuttle valve element.

While one form of the invention has been shown for purposes of illustration, it is to be clearly understood that various changes in the details of construction and arrangement of parts may be made without departing from the spirit and scope of the invention as defined in the appended claims.

I claim:

1. A shuttle valve structure including a casing element having a longitudinal bore and an inlet port communicating with each end thereof and an intermediately disposed outlet port, a shuttle valve element slidably mounted in the bore, non-yielding stop means positively limiting movement of the shuttle valve element at each end of the bore to accurately place the shuttle valve element when slid to a given end of the bore in position for closing the port at that end and opening the port at the other end to communication with the outlet port, said casing element having annular groove equipment therein, said shuttle valve element having annular groove equipment therein, and one said element groove equipment having a ring gasket therein of a greater cross section than the depth of the groove equipment in which it is mounted so as to project therefrom for sealing and yieldable shuttle valve element position-retaining engagement in the groove equipment of the other said element when the shuttle valve element is shifted against one or the other of the movement limiting means and of lesser cross section than the width of the groove equipment in which it is mounted so as to provide clearance for pressure fluid to enter said groove equipment and press the ring in sealing contact between said elements, and to permit shifting of the ring gasket within said groove equipment relative to said non-yielding movement limiting means.

2. A shuttle valve structure including a casing having a longitudinal bore and an inlet port communicating with each end thereof and an intermediately disposed outlet port, a shuttle valve element slidably mounted in the bore, non-yielding stop means positively limiting movement of the element at each end of the bore to accurately place the element when slid to a given end of the bore in position for closing the port at that end and opening the port at the other end to communication with the outlet port, said casing having an annular groove therein adjacent each movement limiting means, said element having an annular groove centered therein, and each said casing groove having a ring gasket mounted for side play therein and projecting inwardly therefrom in position for engaging in sealing contact with the element and in yieldable element position retaining contact in the element groove when the element is shifted against one or the other of said movement limiting means.

3. A shuttle valve structure as defined in claim 2 in which said side play is provided by each ring gasket having a cross section less than the width of the groove in which it is mounted so as to provide clearance for pressure fluid to enter said groove and press the ring in sealing contact between the valve element and the casing.

4. A shuttle valve structure including a casing having a longitudinal bore and an inlet port communicating with each end thereof and an intermediately disposed outlet port, a shuttle valve element slidably mounted in the bore, means limiting movement of the element at each end of the bore to place the element when slid to a given end of the bore in position for closing the port at that end and opening the port at the other end to communication with the outlet port, said casing having an annular groove herein adjacent each movement limiting means, said element having an annular groove centered therein, and each said casing groove having a ring gasket mounted therein and projecting inwardly therefrom in position for engaging in sealing contact with the element and in yieldable element position retaining contact in the element groove when the element is shifted against one or the other of said movement limiting means, each said ring gasket having a cross section less than the width of the groove in which it is mounted so as to provide clearance for pressure fluid to enter said groove and press the ring in sealing contact between the valve element and the casing, each end of the casing being provided with a separate end member including an abutment engageable with the respective end of the casing and determining the width of the respective ring gasket receiving groove, and each said end member including a bore having a counterbore forming the respective inlet port and forming an axially aligned continuation of the casing bore, the end of each end member counterbore forming the shuttle valve element movement limiting means at the respective end of the casing.

ARTHUR L. PARKER.

REFERENCES CITED

The following references are of record in the file of this patent:

UNITED STATES PATENTS

| Number | Name | Date |
|---|---|---|
| 279,562 | Haight | June 19, 1883 |
| 343,327 | Lowrie | June 8, 1886 |
| 445,250 | Lawless | Jan. 27, 1891 |
| 796,580 | Johnston | Aug. 8, 1905 |
| 916,114 | Davis | Mar. 23, 1909 |
| 1,684,905 | Bastian | Sept. 18, 1928 |
| 1,686,310 | Beebe | Oct. 2, 1928 |
| 1,721,114 | Hampton | July 16, 1929 |
| 2,300,694 | Overbeke | Nov. 3, 1942 |
| 2,314,683 | Berry | Mar. 23, 1943 |
| 2,358,228 | Hoof | Sept. 12, 1944 |
| 2,360,839 | Barksdale | Oct. 24, 1944 |
| 2,381,484 | Blank | Aug. 7, 1945 |
| 2,386,585 | Blank | Oct. 9, 1945 |

FOREIGN PATENTS

| Number | Country | Date |
|---|---|---|
| 333,365 | Great Britain | Aug. 14, 1930 |